United States Patent [19]

Sochalski

[11] 4,137,214

[45] Jan. 30, 1979

[54] ASBESTOS FREE FRICTION COMPOSITIONS

[75] Inventor: Henry A. Sochalski, Trenton, N.J.

[73] Assignee: Thiokol Corporation, Newton, Pa.

[21] Appl. No.: 849,722

[22] Filed: Nov. 9, 1977

Related U.S. Application Data

[63] Continuation-in-part of Ser. No. 813,609, Jul. 7, 1977, abandoned.

[51] Int. Cl.$^2$ ............................ C08K 3/22; C08K 3/26; C08K 7/06; C08K 7/14
[52] U.S. Cl. ...................................... 260/38; 106/36; 260/DIG. 41
[58] Field of Search ........................ 260/58, DIG. 41; 106/36

[56] References Cited

U.S. PATENT DOCUMENTS

| | | | |
|---|---|---|---|
| 3,673,276 | 6/1972 | Keller et al. | 260/38 |
| 3,891,595 | 6/1975 | Birchall | 260/38 |
| 3,896,075 | 7/1975 | Langley | 260/38 |
| 3,916,062 | 10/1975 | Dougherty | 428/320 |
| 3,959,194 | 5/1976 | Adelmann | 260/38 X |

*Primary Examiner*—Sandra M. Person
*Attorney, Agent, or Firm*—Stanley A. Marcus; Royal E. Bright

[57] ABSTRACT

Friction compositions containing major proportions of non-fibrous inorganic compounds in place of asbestos are disclosed. The compositions are particularly useful in the preparation of automotive disc brake pads.

18 Claims, No Drawings

ASBESTOS FREE FRICTION COMPOSITIONS

CROSS REFERENCE TO COPENDING APPLICATION

This application is a continuation-in-part of application Ser. No. 813,609, filed July 7, 1977, now abandoned.

BACKGROUND OF THE INVENTION

This invention relates to friction compositions, particularly asbestos free friction compositions especially suitable for use as disc brake pads or drum shoe lining in the automotive industry.

Because of its assumed chemical and biological inertness, its temperature resistance, its fibrous nature, and its possession of approximately the appropriate degree of hardness and coefficient of friction with ferrous metals, asbestos has been used as a mainstay of friction materials in industry in general and in particular, in the automotive industry. The composition of these materials frequently included additives of various types to improve their bonding characteristics, their noise generating potential, their heat transfer ability, or even to reduce their costs. Among the additives listed in the prior art are zinc oxide and calcium carbonate used in percentages of less than 20% in combination with asbestos or even on occasion with other fibrous materials.

Applicant considers the following U.S. patents to be relevant to his invention or to particularly preferred embodiments thereof. Copies thereof accompany this application.

U.S. Pat. No. 2,078,617—Spokes disclosing the use of cashew nut oil in friction surfaces such as brakes and clutches. The use of asbestos is contemplated (col. 3, line 59).

2,158,337—Rasmussen describes a brake lining having a glass fiber incorporated therein. The glass fiber may be used in place of asbestos and is contemplated as the primary friction material.

2,165,140—Harvey discloses friction elements containing hexamethylene tetramine modified cashew nut oil, and phenolic resins used with fillers in the usual proportions, such as zinc oxide, carbon, barytes and rubber. Fibers other than asbestos may be used.

3,526,306—Bentz et al., discloses a clutch facing which contains glass filaments in combination with asbestos, phenolic resins, butadiene-acrylonitrile rubber, barytes and particulate cashew nut oil.

3,850,874—Grazen et al., discloses a friction element containing a substitute material for the cashew nut oil particles of conventional friction compositions.

3,857,811—Grazen et al., claims the composition of the substitute material used in the 3,850,874 patent.

3,297,599—Eschen discloses the use of calcium aluminate in otherwise conventional brake compositions.

3,916,062—Dougherty discloses the use of molecular sieves in otherwise conventional friction materials, and 4,002,592—Baskin discloses the use of spinels in low concentration as friction modifiers in otherwise conventional friction compositions.

The compositions of this invention employ zinc oxide and/or calcium carbonate and materials with similar properties, as set forth more fully hereinafter, in quantities greater than 20% to totally replace asbestos in friction compositions.

Replacement of asbestos has, of course, become desirable from the standpoint of friction material manufacturers and of those who directly handle the finished product in putting it into the vehicle in which it is used because of respiratory hazards found to be associated with its use and the expense of health precautions now required for its safe handling.

SUMMARY OF THE INVENTION

The invention provides in a composition aspect a substantially asbestos free friction material which comprises as essential ingredients:
 a. a thermosetting resin;
 b. cashew particles;
 c. a structural integrity providing proportion of a non-asbestos fiber; and
 d. more than 20% by weight of a powdered inorganic compound having a Moh's hardness rating greater than 2.0 and less than 5.0 and capable of being subjected to temperatures of greater than about 425° C. without substantial chemical or physical alteration.

The tangible embodiments of this composition aspect of the invention possess the inherent applied use characteristic of being friction materials particularly suitable for fabrication into disc brake pads for automotive use. The compositions possess wear and braking qualities comparable to similar compositions containing asbestos.

The invention also provides in a preferred aspect of this composition aspect of the invention a friction composition which comprises, in addition to the aforementioned essential ingredients, barytes.

The invention also provides another preferred aspect of this composition aspect of the invention which comprises, in addition to the aforementioned essential ingredients, rubber particles. The invention also provides in another preferred aspect of this composition aspect of the invention a friction composition which comprises, in addition to the aforementioned essential ingredients, non-ferrous metal chips.

The invention further provides in another preferred aspect of this composition aspect of the invention a friction composition which comprises, in addition to the aforementioned essential ingredients, 1 to 15% by weight of an unloaded molecular sieve.

Special mention is made of compositions of this composition aspect of the invention wherein the powdered inorganic compound is
 1. Zinc oxide;
 2. Calcium carbonate;
 3. Zinc oxide and calcium carbonate in combination.

The invention also provides in a composition aspect an improved friction composition suitable for use in brakes for automotive vehicles wherein the improvement comprises replacing the entire asbestos content of conventional automotive brake pad compositions with greater than 20% by weight of the total pad contents of a powdery inorganic material a Moh's hardness rating of greater than 2.0 and less than 5.0 and capable of withstanding temperatures of greater than about 425° C. without substantial chemical or physical decomposition together with a minor proportion of a non-asbestos fibrous material.

The invention also provides in a process aspect a process for the manufacture of an asbestos free automatic brake shoe which comprises fastening to a conventional brake shoe backing plate, a friction pad formed from the asbestos free friction compositions of this invention.

DESCRIPTION OF THE PREFERRED EMBODIMENT

The compositions of the present invention may be prepared in a fashion analogous to that employed for the preparation of known prior art compositions from well-known commercially available materials. The thermosetting resins generally known to be useful in the production of brake lining materials may be employed. These include, for example, urea formaldehyde resins, cresol resins, phenol formaldehyde resins, melamine formaldehyde resins, alkyds, polysiloxanes and epoxy resins. The phenol formaldehyde resins are preferred. The cashew particles are the conventional thermosetting cashew nut resins commonly employed in fabricating brake shoe pads which are preferred. Other equivalent products are known, such as those described in U.S. Pat. Nos. 3,658,751, 3,850,874 and 3,857,811. As used herein and in the appended claims the term cashew particles or cashew nut particles also contemplates these known equivalent materials. The non-asbestos fiber or fibrous material may be any organic or inorganic fibrous material which is capable of providing structural integrity to the mixed uncured friction composition until, upon cure, it is fused into a solid mass. The term will therefore include the degradation products of those fibrous materials which do not survive the curing process temperatures, approximately 160° C., unaltered. Suitable materials include, for example, fiberglass, mineral wool, silica fibers, carbon fibers, boron fibers, and the like, cotton, rayon, polyamide, polyester fibers and the like, as well as tungsten or steel fibers and the like. While essentially any non-asbestos fiber will suffice for structural integrity purposes during the molding process, it will be apparent that for greater structural integrity during use a fiber capable of withstanding the temperatures generated immediately below the rotor stator interface will be preferred. It is apparent that the majority of such materials will be inorganic in nature. It has been found in the manufacture of the disc brake pads of the invention that a mixture of longer and shorter fiber lengths may be a convenience in processing and may improve the integrity of the finished pad. The powdered inorganic compound which is employed in a relatively high percentage of the composition to replace the asbestos may include a number of materials such as zinc oxide, or calcium carbonate, which have been normally considered as fillers when used in small quantities in prior art asbestos containing brake compositions. Essentially any material known to have the necessary hardness range and to be able to withstand the temperatures encountered immediately below the rotor stator interface during braking may be employed. In addition to the zinc oxide and calcium carbonate already mentioned, other suitable inorganic materials may be exemplified by:

Anglesite ($PbSO_4$)
Anhydrite ($CaSO_4$)
Apatite ($CaF_2.3Ca_3P_2O_8$)
Augite ($CaMg(SiO_3)_2+(Mg, Fe)-(AlFe)_2SiO_6$)
Barysilite ($Pb_3Si_2O_7$)
Biotite ($(K,H)_2(Mg, Fe)_2(Al, Fe)_2(SiO_4)_3$)
Bornite ($FeS.2Cu_2S.CuS$)
Celestite ($SrSO_4$)
Chalcopyrite ($CuFeS_2$)
Chiolite ($5NaF.3AlF_3$)
Clinochlorite ($H_8Mg_5Al_2Si_3O_{18}$)
Crocoite ($PbCrO_4$)
Cryolite ($Na_3AlF_6$ or $3NaF.AlF_3$)
Cryolithionite ($3NaF.3LiF.2AlF_3$)
Cuprite ($Cu_2O$)
Eulytite ($3SiO_2.2Bi_2O3$)
Ferberite ($FeWO_4$)
Forsterite ($Mg_2SiO_4$)
Galena ($PbS$)
Glauberite ($Na_2SO_4.CaSO_4$)
Halite ($NaCl$)
Lanarkite ($Pb_2S.(SO_4)$)
Laurionite ($PbCl_2.Pb(OH)_2$)
Leadhillite ($Pb(OH)_2.PbSO_4.2PbCO_3$)
Lepidolite ($KLi[Al(OH, F)_2]Al(SiO_3)_3$)
Litharge ($PbO$)
Matlockite ($PbO.PbCl_2$)
Mendipite ($2PbO.PbCl_2$)
Mimetite ($9PbO.3As_2O_5.PbCl_2$)
Monetite ($HCaPO_4$)
Nantokite ($CuCl$)
Parisite ($CaO.2CeOF.3CO_2$)
Phlogopite ($(K,H)_3Mg_3Al(SiO_4)_{3...}(+Na, Fe, F)$)
Powellite ($CaO.MoO_3$)
Pyromorphite ($PbCl_2.3Pb_3(Po_4)_2$)
Pyrrhotite ($Fe_5S_6 2Fe_{16}S_{17}$)
Scheelite ($CaWo_4$)
Stolzite ($PbO.WO_3$)
Strontianite ($SrCO_3$)
Sylvite ($KCl$)
Thenardite ($Na_2SO_4$)
Triphylite-lithiophyllite ($Li(Fe, Mn)PO_4$)
Vanadinite ($9PbO.3V_2O_5.PbCl_2$)
Villiaumite ($NaF$)
Witherite ($BaO.CO_2$)
Wollastonite ($CaSiO_3$)
Wulfenite ($PbMoO_4$)
Xenotime ($Y_2O_3.P_2O_5$)

The powdery inorganic materials may be crystalline or amorphous in structure as long as they fall within the hardness range for their individual particles and are able to maintain stability within the desired temperature range. The particle size of these powdery materials is not particularly critical. The particle sizes normally employed for powdery fillers in brake materials are satisfactory but wide deviations therefrom will have no substantial effect on performance. Particle sizes from 0.5 to 100 microns may be used and a particular range of sizes may be employed at the option of one skilled in the art to facilitate ease of processing and the attainment of a uniform product.

To prepare the compositions of the invention, 10 to 30% by weight preferably about 15 to 20% by weight of the thermosetting resin, 5 to 25% preferably about 10 to 15% cashew nut particles, from 5 to 15% preferably 6 to 12½% of the non-asbestos fibers and from 20 to 60% preferably about 25 to 35% of the inorganic powder are blended in the usual fashion for manufacture of friction materials. After thorough blending the mixture may then be placed into the appropriate molds and cured under heat and pressure in the usual fashion. If desired, after curing and demolding are completed, the pads may be trimmed of any excess material to the exact shape desired by standard techniques well-known to anyone in the art.

It is contemplated that the finished pads will then be fastened onto standard brake shoe members by conventional means, either by integral molding, riveting or bonding with a rubber solvent based adhesive, as desired, for installation into convention brake assemblies.

One skilled in the art will recognize that while the aforementioned compositions represent basic compositions suitable for use as a friction pad, various other additives commonly used in known friction compositions may also be incorporated. Among these are such typical additives as barytes which may be added for their polishing action on the metal braking surface, rubber particles which may be incorporated for their noise resistance, metal chips optionally included for their additional friction imparting ability, and molecular sieves, as illustrated in U.S. Pat. No. 3,916,062, which may be employed for their ability to impart fade resistance. Such materials will be employed in conventional proportions well recognized in the art.

One skilled in the art will also recognize that, in addition to single powdered inorganic compounds, for replacement of the asbestos fibers one may incorporate mixtures of two or more of these compounds.

As used herein and in the appended claims the expression "without substantial chemical or physical alteration" means that substantially no change in the chemical structure of the compounds occurs such as, for example, oxidation, reduction, or significant loss of any particular element or elements in the molecular formula, and that the crystalline structure, if any, or other spatial arrangement of the various atoms in a particular solid is essentially unaltered.

The following Examples further illustrate the best mode contemplated by the inventor for the practice of his invention.

EXAMPLES 1 AND 2

Sample asbestos containing disc brake pads to be used as controls in a series of comparative tests were prepared as follows:

A Patterson-Kelley blender equipped with a whirling agitator is charged with asbestos, phenolic resin, cashew particles, rubber particles, calcium aluminate, barytes, zinc chips, hexamethylene tetramine, carbon black, and 3A molecular sieves in proportions taught by U.S. Pat. No. 3,916,062.

The blender is tumbled for 30 seconds, after which the agitator is turned on and the mixer run for an additional 4.5 minutes. The mixer is then discharged into a container.

Disc brake pads are molded from the mixture by placing a quantity in a mold and treating at 1200 psi with a 10 second dwell time in the mold. The sample is then cured at 300° F. for 15 minutes at 4000 psi with degassing at the end of one minute and at the end of 2.5 minutes. The resulting disc pads are then ejected from the mold and allowed to cool.

The edges of the sample are then trimmed to remove excess material and the samples post-baked while under constraint in a forming container to prevent swelling for a period of 8 hours. The temperature is increased linearly over a period of 1.5 hours to 400° F. and then held at that point for the remaining period. After cooling the samples are released from the constraining form.

Example 1 represent asbestos pads prepared in the laboratory, Example 2 represents identical pads prepared in a production plant.

The pads so fabricated are then fastened on appropriate metal backing plates in conventional fashion and installed in a full size 1976 Mercury Sedan for road testing. The testing procedure followed is a simulated drive on Whitehorse Mountain.

1. The effectiveness of the brakes is determined at 30 and 60 miles per hour (m.p.h.) with 200° F. being the limit for the hottest rotor or drum.

2. The brakes are cooled at 150° F. hottest rotor or drum and the starting temperatures are recorded.

3. The recovery is checked by stopping 30–0 m.p.h. at 10 feet per sec$^2$ in gear.

4. Three warm up stops 55–5 m.p.h., at 15 feet per sec.$^2$ in gear.

5. Seven snub stops 50–40 m.p.h., at 10 feet per sec$^2$ in gear and the temperature recorded.

6. The first fade stop is conducted 55–0 m.p.h., at 15 feet per sec$^2$ in gear and the temperatures are recorded.

7. Seven more snub stops similar to the first set are performed.

8. The second fade stop similar to the first is performed and the temperatures are recorded.

9. Four more snub stops similar to the first set are performed.

10. A third fade stop similar to the earlier two is performed.

11. Seven more snub stops similar to the first set are performed.

12. A fourth fade stop similar to the earlier three is performed.

13. The vehicle is driven at 40 m.p.h. for 0.4 mile. The maximum temperatures are recorded.

14. The vehicle is further driven at 40 m.p.h. and the temperatures recorded 0.2 mile before the recovery stop.

15. A recovery stop is performed 30–0 m.p.h. at 10 feet per sec$^2$ in gear.

16. Items 14 and 15 are repeated until a total of eight recovery stops have been completed and the temperatures are recorded.

17. A fade stop check is then performed 55–0 m.p.h. at 15 feet per sec$^2$ in gear.

18. Steps 2 through 17 inclusive are repeated for a total of 3 laps.

19. The effectiveness of the brakes is checked at 30 and 60 m.p.h. with 200° F. for the hottest rotor or drum.

20. The brakes are then inspected and wear measured.

The linings are evaluated during the test for noise and rubber banding or a scale of 10 no noise to 0 totally unacceptable, and of course, for fade and stopping ability. At completion of the test the brakes are examined for pad wear and condition and rotor condition. The results so obtained are summarized in Table I.

TABLE I

|  | Ex. 1 | Ex. 2 |
| --- | --- | --- |
| Noise and Rubber Banding | None | None |
| Lining Condition | Dull Mottled Light Spewing | Light Spewing |
| Rotor Condition | 70–85% Transfer of Material | Heavy Texture |
| Maximum Wear (in) | 0.078 | 0.023 |
| Test Evaluation | Slightly over effective, all other phases of test satisfactory | Good performance, good wear and rotor conditioning |

EXAMPLES 3 THRU 6

Following a procedure analogous to that described in Examples 1 and 2 the ingredients shown in Table II are formulated, and cured into disc brake pads.

TABLE II

| Ingredients | Example No. Quantity (p.b.w.) | | | |
|---|---|---|---|---|
| | 3 | 4 | 5 | 6 |
| Zinc Oxide | 40 | 40 | 40 | 40 |
| Thermosetting Phenolic Resin | 23 | 23 | 23 | 23 |
| Fiberglass | 5 | — | — | — |
| *Fiberglass (fluffed before addition) | — | 5 | 5 | 5 |
| Cashew Nut Resin Particles | 14 | 14 | 14 | 14 |
| Calcium Aluminate | 2 | 2 | 2 | 2 |
| Barytes | 15 | 15 | 15 | 15 |
| Zinc Metal Chips | 4 | 4 | 4 | 4 |
| Hexamethylene Tetramine | 2 | 2 | 2 | 2 |
| Carbon Black | 1 | 1 | 1 | 1 |
| 3A Molecular Sieves | 5 | 5 | 5 | 5 |
| Rubber Particles | 13.8 | 13.8 | 13.8 | 13.8 |

*Cut floc tumbled for a short period to render it fluffy.

All cures were at 300° F. for 15 minutes in the mold and then for 8 hours at 400° F. for the post-cure conditioning.

When tested as described for Examples 1 and 2 the results obtained are summarized in Table III.

TABLE III

| | Example | | | |
|---|---|---|---|---|
| | 3 | 4 | 5 | 6 |
| Noise and Rubber Banding | 8 Instances Squealing Worst rating 8 | 41 Instances Squealing Worst rating 3 | 30 Instances Rubber Banding Worst rating 8-35 Instances Squealing Worst rating 3 | 17 Instances Rubber Banding Worst rating 8 |
| Lining Condition | Inboard Flowed | Inboard Flowed | Heavy Cracks | Light Cracks |
| Rotor Condition | 100% Satin | 100% Satin | 50-70% Satin | Medium Texture |
| Maximum Wear | .096 in. | .061 in. | .060 in. | .055 in. |
| Test Evaluation | Pedal Floored 1 & 2 laps. Inboard pads showed flow of material | High Compressability, unacceptable noise | Performance OK, noise and rubber banding throughout test | — |

*Example No. 6 was tested over a standardized 16.5 mile circuit established in the Downtown traffic area of a major Eastern city.

EXAMPLES 7 AND 8

Brake pads are formulated and cured as in the previous Examples. The proportions of the ingredients used are shown in Table IV.

TABLE IV

| Ingredients | Example Quantity (p.b.w.) | |
|---|---|---|
| Zinc Oxide | 24 | — |
| Fiberglass (fluffed) | 5 | 5 |
| Thermosetting Phenolic Resin | 23 | 23 |
| Cashew Nut Resin Particles | 14 | 14 |
| Rubber Particles | 13.8 | 13.8 |
| Calcium Aluminate | 2 | 2 |
| Barytes | 31 | 55 |
| Zinc Particles | 4 | 4 |
| Hexamethylene Tetramine | 2 | 2 |
| Carbon Black | 1 | 1 |
| 3A Molecular Sieves | 5 | 5 |

Cure and post-cure conditioning are as described for Examples 3-6.

Testing is as described for Examples 1 and 2. Results are summarized in Table V.

TABLE V

| | Example | |
|---|---|---|
| | 7 | 8 |
| Noise and Rubber Banding | 11 Instances Squealing Worst rating 7 | 13 Instances Rubber Banding Worst rating 7 3 Instances Squealing Worst rating 8 |
| Lining Condition | Heavy Cracks | Heavy Cracks |
| Rotor Condition | Light Score | 50% Polish 50% Heavy Texture |
| Maximum Wear (in) | .041 | .150 |
| Test Evaluation | Slow recovery, some noise, light rotor score | Poor pad strength, high wear, frequent banding, high compressability |

EXAMPLES 9 THRU 13

Brake pads are formulated and cured as in the previous Examples. The formulations are given in Table VI.

TABLE VI

| Ingredient | Example Quantity (p.b.w.) | | | | |
|---|---|---|---|---|---|
| | 9 | 10 | 11 | 12 | 13 |
| Zinc Oxide | 27.5 | 27.5 | 27.5 | 27.5 | 27.5 |
| Fiberglass (fluffed) | 5 | 5 | 5 | 5 | 5 |
| Thermosetting Phenolic Resin | 23 | 18 | 23 | 23 | 23 |
| Cashew Nut Resin Particles | 14 | 14 | 14 | 14 | 14 |
| Rubber Particles | 13.8 | 13.8 | 19 | 19 | 14 |
| Calcium Aluminate | 2 | 2 | 2 | 2 | 2 |
| Barytes | 27.5 | 27.5 | 27.5 | 27.5 | 27.5 |
| Zinc Metal Chips | 4 | 4 | 4 | 4 | 4 |
| Hexamethylene Tetramine | 2 | 2 | 2 | 2 | 2 |
| Carbon Black | 1 | 1 | 1 | 1 | 1 |
| 3A Molecular Sieves | 5 | 5 | 5 | 5 | 5 |
| Chunky Graphite | — | — | — | — | 2 |

Pads are cured and conditioned as described for Examples 3 thru 6 and tested as described for Examples 1 and 2. The results are summarized in Table VII.

TABLE VII

| | Example No. | | | | |
|---|---|---|---|---|---|
| | 9 | 10 | 11 | 12 | 13 |
| Noise | 12 Instances Squealing Worst ratng 6 | 12 Instances Squealing Worst rating 6 | — | — | — |
| Lining Condition | Light cracks | Heavy spewing and pitting, cracked | Cracked heavily | — | — |

TABLE VII-continued

| | Example No. | | | | |
|---|---|---|---|---|---|
| | 9 | 10 | 11 | 12 | 13 |
| Rotor Condition | 50% Satin 50% Polish | 80% Heavy Transfer | 60% Heavy Build up | — | — |
| Maximum Wear (in) | .028 | .064 | .163 | — | — |
| Test Evaluation | Excellent performance wear and rotor conditioning. Noise and cracks present | Test rated satisfactory however light rotor score was recorded | Test incomplete due to pad failure | Test Aborted after burnish due to noise problem | Test Aborted after burnish due to noise problem |

EXAMPLES 14 THRU 19

Brake pads are formulated and cured as in the previous Examples. The formulations are shown in Table VIII.

TABLE VIII

| | Example Quantity (p.b.w.) | | | | | |
|---|---|---|---|---|---|---|
| Ingredient | 14 | 15 | 16 | 17 | 18 | 19 |
| Zinc Oxide | 27.5 | 50 | 27.5 | 27.5 | 27.5 | 27.5 |
| Fiberglass (fluffed) | 10 | 5 | 5 | 5 | 10 | 10 |
| Thermosetting Phenolic Resin | 23 | 15 | 23 | 23 | 23 | 23 |
| Cashew Nut Resin Particles | 14 | 14 | 14 | 14 | 14 | 14 |
| Rubber Particles | 14 | 13.8 | 14 | 14 | 14 | 14 |
| Calcium Aluminate | 2 | 2 | 2 | 2 | 2 | 2 |
| Barytes | 27.5 | 15 | 27.5 | 27.5 | 27.5 | 27.5 |
| Zinc Metal Chips | 4 | 4 | 4 | 4 | 4 | 4 |
| Hexamethylene Tetramine | 2 | 2 | 2 | 2 | 2 | 2 |
| Carbon Black | 1 | 1 | 1 | 1 | 1 | 1 |
| 3A Sieves | 5 | 5 | 5 | 5 | 5 | 5 |
| Cryolite | — | — | 5 | — | — | — |

Cure and conditioning are as described for Examples 3 through 6 and testing is as described for Examples 1 and 2. Results are summarized in Table IX.

TABLE IX

| | Example | | | | | |
|---|---|---|---|---|---|---|
| | 14 | 15 | 16 | 17 | 18 | 19 |
| Noise and Rubber Banding | 9 Instances Squealing Worst rating 8 | 2 Instances Squealing Worst rating 8 | 15 Instances Squealing Worst rating 8 | None | 4 Instances Squealing Worst rating 8 | None |
| Lining Condition | Heavy spewing-Heavy pitting | Med. spewing-light pitting surface cracks | Light spewing-heavy pitting | Med. spew | Pads broken | L. Side broken R. Side heavy spew |
| Rotor Condition | 70% Satin | 80% Satin | 75% Polish | 100% Dark Satin | 75% Satin | 90% Dark Satin |
| Maximum Wear (in) | .055 | .195 | .030 | .055 | .328 | .061 |
| Test Evaluation | 9 Marks, all other phases of test satisfactory | Pedal Floored 1st lap high wear good rotors 2nd & 3rd laps satisfactory | 15 Marks, all other phases satisfactory | Test results satisfactory, rear brakes developed abnormally high temperature | Test results poor high wear scored rotors | |

EXAMPLES 20 THRU 26

Brake pads are formulated and cured as in the previous experiments. The formulations are shown in Table X.

TABLE X

| | Example Quantity (p.b.w.) | | | | | | |
|---|---|---|---|---|---|---|---|
| Ingredient | 20 | 21 | 22 | 23 | 24 | 25 | 26 |
| Zinc Oxide | 27.5 | 27.5 | 50 | 27.5 | 45 | 55 | 27.5 |
| Fiberglass (fluffed) | 7.5 | 7.5 | 5 | 5 | 5 | 5 | 7.5 |
| Thermosetting Phenolic Resin | 23 | 23 | 15 | 23 | 15 | 15 | 23 |
| Cashew Nut Resin Particles | 14 | 14 | 14 | 14 | .4 | 14 | 14 |
| Rubber Particles | 14 | 10 | 8.8 | 14 | 8.8 | 8.8 | 8 |
| Calcium Aluminate | 2 | 2 | 2 | 2 | 2 | 2 | 2 |
| Barytes | 27.5 | 27.5 | 15 | 27.5 | 15 | 15 | 27.5 |
| Zinc Chips | 4 | 4 | 4 | 4 | 4 | 4 | 4 |
| Hexamethylene Tetramine | 2 | 2 | 2 | 2 | 2 | 2 | 2 |
| Carbon Black | 1 | 1 | 1 | 1 | 1 | 1 | 1 |
| 3A Molecular Sieves | 5 | 5 | 5 | 5 | 5 | 5 | 5 |

Cure and post-cure conditioning are as described for Examples 3–6. Testing is as described for Examples 1 and 2. Results are given in Table XI.

TABLE XI

| | Example | | | |
|---|---|---|---|---|
| | 20 | 21 | 22 | 23 |
| Noise and Rubber Banding | None | None | 3 Instances Pinch out Squeal Worst rating 9 | 4 Instances Erratic braking-1 pinch out squeal rating 9 |
| Lining Condition | L. Side Broken Spewing | Med. Spewing R. Side Heavy | Heavy Spewing | Med. Spewing |
| Rotor Condition | 90% Dark Satin | 100% Satin | 100% Dark Satin | 100% Satin |
| Maximum Wear (in) | .061 | .026 | .036 | .018 |
| Test Evaluation | Low Effectiveness, rear brakes developed high temperature, pads show little | SLow Recovery, high line pressures-high temperature, rear brakes | All Phases of test rated good | Low Effectiveness, very high rear temperatures, both due to fact that front linings |

TABLE XI-continued

|  | Example No. | | |
| --- | --- | --- | --- |
|  | 24 | 25 | 26 |
|  | wear | good rotor condition low wear | were under effectiveness 2nd & 3rd laps |
| Noise and Rubber Banding | 2 Instances Squealing Worst rating 9 | 4 Instances Squealing Worst rating 8 | None |
| Lining Condition | Med. Spewing | Med. Spewing | Light Spewing |
| Rotor Condition | 95% Satin | 95% Satin | 95% Satin |
| Maximum Wear (in) | .050 | .051 | .040 |
| Test Evaluaton | Slow recovery, high snub pressure throughout, slightly over effective after curve | All phases noted satisfactory, same noise (SQ 8, 9) which was eliminated by 2nd lap | High line pressures no recovery fair effectiveness high rear temperature |

*Pinch out squeal is a high pitched squeal at end of braking.

EXAMPLES 27 THRU 29

Brake pads formulated and cured as in the prior Examples. The formulations are shown in Table XII.

TABLE XII

|  | Example No. | | |
| --- | --- | --- | --- |
|  | Quantity (p.b.w.) | | |
| Ingredient | 27 | 28 | 29 |
| Zinc Oxide | 27.5 | 50 | 50 |
| Fiberglass (Fluffed) | 7.5 | 5 | 5 |
| Thermosetting Phenolic Resin | 23 | 15 | 18 |
| Cashew Nut Resin Particles | 14 | 14 | 14 |
| Rubber Particles | 10 | 8.8 | 8.8 |
| Calcium Aluminate | 2 | 2 | 2 |
| Barytes | 27.5 | 15 | 15 |
| Zinc Metal Chips | 4 | 4 | 4 |
| Hexamethylene Tetramine | 2 | 2 | 2 |
| Carbon Black | 1 | 1 | 1 |
| 3A Molecular Sieves | 5 | 5 | — |

Cure and post-cure conditioning is as described for Examples 3-6. The pads so produced are mounted in the usual fashion on a standard 1976 Mercury Sedan as in the prior Examples and tested for fade resistance as follows:

1. 3 Successive stops are made 30-0 m.p.h. at 10 feet per sec$^2$, in high gear, 190°-200° F. one brake temperature maximum.

2. 10 stops to check fade are made 60-0 m.p.h. in high gear with a 4 mole interval at 15 feet per sec$^2$ and 140°-150° F. one brake temperature maximum for 1st stop.

3. The car is driven at 40 m.p.h. cooling speed for one mile after the last fade stop.

4. 5 stops from 30 m.p.h. at 10 feet per sec$^2$ in highest gear are performed.

5. The brakes are then burnished by 35 stops from 40 m.p.h. at 12 feet per sec$^2$ with 250° 1 brake temperature or 1 mile maximum in gear.

6. Steps 1, 2 and 3 are then repeated.

7. The brakes are then checked for wear and condition. The results are summarized in Table XIII.

TABLE XIII

|  | Example No. | | |
| --- | --- | --- | --- |
|  | 27 | 28 | 29 |
| Noise and Rubber Banding | 4 Instances rubber banding-worst rating 9-4 instances squealing-worst rating 9-1 Instances erratic brake | 19 Instances squealing worst rating 9 2 Instances wire brush wound-worst rating 9-3 instances-pinch out squeal worst rating 9 |  |
| Lining Condition | Outboard broken Inboard cracked | Light spewing Light pitting | Med. spewing Light pitting |
| Rotor Condition | 30% Polish 70% Transfer | 70% Satin 30% Polish | 50% Satin 50% Medium-heavy transfer |
| Maximum Wear (in) | .252 | .062 | .100 |
| Test Evaluation | 10 Stop fade OK Pedal floored 9-15-stop fade, lining badly broken and cracked, test poor |  |  |

EXAMPLES 30 THRU 39

Brake pads are formulated and cured as in the previous Examples. The formulations are shown in Table XIV.

TABLE XIV

|  | Example No. | | | | | | | | | |
| --- | --- | --- | --- | --- | --- | --- | --- | --- | --- | --- |
|  | Quantity (p.b.w.) | | | | | | | | | |
| Ingredient | 30 | 31 | 32 | 33 | 34 | 35 | 36 | 37 | 38 | 39 |
| Zinc Oxide | 45 | 50 | 50 | 25 | 50 | 50 | — | 50 | 50 | 50 |
| Calcium Fluoride | — | — | — | 25 | — | — | 50 | — | — | — |
| Fiberglass (fluffed) | 5 | 5 | 5 | 5 | 5 | 5 | 5 | 5 | 5 | 2.5 |

TABLE XIV-continued

| Ingredient | 30 | 31 | 32 | 33 | 34 | 35 | 36 | 37 | 38 | 39 |
|---|---|---|---|---|---|---|---|---|---|---|
| Thermosetting Phenolic Resin | 15 | 15 | 18 | 15 | 15 | 15 | 15 | 15 | 18 | 15 |
| Cashew Nut Resin Particles | 14 | 14 | 14 | 14 | 14 | 14 | 14 | 14 | 14 | 14 |
| Rubber Particles | 10 | 8.8 | 8.8 | 8.8 | 8.8 | 8.8 | 8.8 | 8.8 | 8.8 | 8.8 |
| Calcium Aluminate | 2 | 2 | 2 | 2 | 2 | 2 | 2 | 4 | 2 | 2 |
| Barytes | 15 | 15 | 15 | 15 | 15 | 15 | 15 | 15 | 15 | 15 |
| Zinc Metal Chips | 4 | 4 | 4 | 4 | 4 | 4 | 4 | 4 | 4 | 4 |
| Hexamethylene Tetramine | 2 | 2 | 2 | 2 | 2 | 2 | 2 | 2 | 2 | 2 |
| Carbon Black | 1 | 1 | 1 | 1 | 1 | 1 | 1 | 1 | 1 | 1 |
| 3A Molecular Sieves | 5 | 5 | 5 | 5 | 5 | 0 | 5 | 5 | 5 | 5 |
| Graphite | — | — | 1 | — | — | — | — | — | 1 | — |

The pads are cured and post-cure conditioned as described in Examples 3-6. Testing for Examples 30, 32-37 and 39 is as described for Examples 1 and 2. Examples 31 and 38 are tested as for Examples 6.

The results are summarized in Table XV.

TABLE XV

| | 30 | 31 | 32 | 33 | 34 | 35 |
|---|---|---|---|---|---|---|
| Noise and Rubber Banding | None | — | None | None | 6 Instances Squealing Worst rating 9 1 Instance Wire brush Sound-Worst Rating 9 | 1 Instance Squealing Worst rating 8 |
| Lining Condition | No spewing Lt. surface cracks | — | Lt. spewing Med. cracks | Lt. spewing Med. heavy cracks | Lt. spewing surface cracks | Med. spewing heavy cracks |
| Rotor Condition | 100% Satin | — | 65% Satin | 30% Polish | 90% Dark Satin | 70% Polish |
| Maximum Wear (in) | .023 | — | .037 | .033 | .025 | .034 |

| | 36 | 37 | 38 | 39 |
|---|---|---|---|---|
| Noise and Rubber Banding | 5 Instances pull to right 5 Instances rubber banding | 6 Instances squeal rubber banding 1 pinch out squeal | Groan | 2 Instances pull to right 6 Instances squeal |
| Lining Condition | Lt. med. spewing Lt. med. cracks | Lt. spewing-lt. cracks-lt. pitting | No spewing-lt. med. cracks med. pitting | Lt. spewing-lt. crdacks-lt.- med. pitting |
| Rotor Condition | 90% Satin | 45% Satin 15% Polish 40% Transfer | 10% Satin-90% Polish-Much marks visible | 95% Satin-5% Polish |
| Maximum Wear (in) | .035 | .042 | .017 | .060 |

EXAMPLES 40 THRU 48

Brake pads are formulated and cured as described in the previous Examples. The formulations are as given in Table XVI.

Cure and post-cure conditioning are as described for Examples 3-6. The pads are mounted in standard fashion on a 1976 Mercury full size Station Wagon. The pads from Examples 40 through 44, 47 and 48 are tested as described for Examples 1 and 2. The pads from Examples 45 and 46 are tested as described for Examples 27 through 29. The results are summarized in Table XVII.

TABLE XVI

| Ingredient | 40 | 41 | 42 | 43 | 44 | 45 | 46 | 47 | 48 |
|---|---|---|---|---|---|---|---|---|---|
| Asbestos | — | — | — | 28.5 | — | — | — | — | — |
| Zinc Oxide | 30 | 50 | — | 30 | 30 | 30 | 30 | 30 | — |
| Calcium Fluoride | 15 | — | — | — | 15 | 15 | 15 | 15 | — |
| Fiberglass (fluffed) | 10 | 5 | 5 | 2.5 | 12.5 | 12.5 | 12.5 | 12.5 | 5 |
| Calcium Carbonate | — | — | — | — | — | — | — | — | 40 |
| Thermosetting Phenolic Resin | 15 | 15 | 15 | 13 | 15 | 15 | 15 | 15 | 18 |
| Cashew Nut Resin Particles | 14 | 14 | 14 | 14 | 14 | 14 | 14 | 14 | 14 |
| Rubber Particles | 8.8 | 8.8 | 8.8 | 8.8 | 8.8 | 8.8 | 8.8 | 8.8 | 8.8 |
| Calcium Aluminate | 2 | 2 | 2 | 2 | 2 | 2 | 2 | 2 | 2 |
| Barytes | 15 | 15 | 25 | 15 | 15 | 15 | 15 | 15 | 25 |
| Zinc Metal Chips | 4 | 4 | 4 | 4 | 4 | 4 | 4 | 4 | 4 |
| Hexamethylene Tetramine | 2 | 2 | 2 | 2 | 2 | 2 | 2 | 2 | 2 |
| Carbon Black | 1 | 1 | 1 | 1 | 1 | 1 | 1 | 1 | 1 |
| 3A Molecular Sieves | 5 | 5 | 5 | 5 | 5 | 5 | 5 | — | 5 |
| Chunky Graphite | — | 1 | — | — | — | — | — | — | — |
| Cryolite | — | — | 40 | — | — | — | — | — | — |

TABLE XVII

| | Example No. | | | | |
|---|---|---|---|---|---|
| | 40 | 41 | 42 | 43 | 44 |
| Noise and Rubber Banding | None | 91 Instances squealing 1 pinch out squeal | 2 Instances pinch out squeal rating 7-9-2 instances wire brush sound worst rating 8 2 instances rubber banding worst rating 9 | 1 Instance pinch out squeal rating 9 | None |
| Lining Condition | Lt. spewing-lt. cracks-med. heavy pitting | Med. heavy spewing-heavy cracks med. cracks | Lt.-med. spewing heavy cracks and pitting | Heavy spewing lt.-med. pitting-overhang | Lt. spewing-med. pitting-15.-med. cracks |
| Rotor Condition | 65% Satin 35% Polish | 20% Satin 80% Transfer | 65% Satin 20% Polish 15% Transfer | 25% Satin 75% med. Transfer | 95% Satin 50% Polish |
| Maximum Wear(in.) | .037 | .027 | .037 | .036 | .032 |

| | 45 | 46 | 47 | 48 |
|---|---|---|---|---|
| Noise and Rubber Banding | 2 Instances left pull worst rating 1 | 4 Instances left pull worst rating 1 | None | None |
| Lining Condition | Lt. spewing-med. pitting-lt.-med. cracks-right front outboard failed but not badly | Lt. spewing-med. pitting-lt.-med. cracks-right front outboard failed but not badly | Lt. cracks-med. heavy pitting lt. spewing | Med. cracks-lt. spewing-med. heavy pitting |
| Rotor Condition | 10% Transfer 5% Polish 85% Satin | 90% Satin-10% med. transfer | 20% Polish-80% Satin | 85% Satin-15% Polish |
| Maximum Wear (in) | .083 | .048 | .035 | .030 |

EXAMPLES 49 THRU 51

Brake pads are formulated and cured as in the prior Examples. The formulations are given in Table XVIII.

TABLE XVIII

| | Example No. | | |
|---|---|---|---|
| | Quantity (p.b.w.) | | |
| Ingredient | 49 | 50 | 51 |
| Zinc Oxide | — | 10 | 20 |
| Calcium Fluoride | — | 35 | 25 |
| Fiberglass (fluffed) | 5 | 12.5 | 12.5 |
| Calcium Carbonate | 40 | — | — |
| Thermosetting Phenolic Resin | 15 | 15 | 15 |
| Cashew Nut Resin Particles | 14 | 14 | 14 |
| Rubber Particles | 8.8 | 8.8 | 8.8 |
| Calcium Aluminate | 2 | 2 | 2 |
| Barytes | 15 | 15 | 15 |
| Clay | 10 | — | — |
| Zinc Metal Chips | 4 | 4 | 4 |
| Hexamethylene Tetramine | 2 | 2 | 2 |
| Carbon Black | 1 | 1 | 1 |

Pads are cured and post-cure conditioned as described in Examples 3-6. Testing is on a full size 1976 Mercury Sedan as described for Examples 1 and 2. Results are shown in Table XIX.

TABLE XIX

| | Example No. | | |
|---|---|---|---|
| | 49 | 50 | 51 |
| Noise and Rubber Banding | 7 Instances squealing worst rating 9 1 Instance pinch out squeal-rating 9-1 instance left pull rating 1 | 1 Instance wire brush sound rating 9-9 Instances rubber banding-worst rating 7-2 instances squealing worst rating 9 | 2 Instances left pull worst rating 1 1 Instance squealing rating 9 |
| Lining Condition | Med. heavy pitting-med. spewing and cracks | Med. heavy pitting-surface cracks | Med. heavy pitting and cracks-med. spewing. |
| Rotor Condition | 40% Polish 60% Satin | 25% Satin 75% Polish | 40% Satin 60% Polish |

TABLE XIX-continued

| | Example No. | | |
|---|---|---|---|
| | 49 | 50 | 51 |
| Maximum Wear (in) | .062 | .025 | .029 |

EXAMPLE 52

Brake pads are formulated and cured as in the prior Examples. The ingredients are:

| Ingredient | Quantity (p.b.w.) |
|---|---|
| Calcium Carbonate | 40 |
| Fiberglass (fluffed, ⅛ in.)* | 5 |
| Fiberglass (fluffed, ¼ in.)* | 5 |
| Thermosetting Phenolic Resin | 22 |
| Cashew Particles | 14 |
| Rubber Particles | 8.8 |
| Barytes | 25 |
| Zinc Metal Chips | 4 |
| Carbon Black | 1 |
| Hexamethylene Tetramine | 2 |
| Molecular Sieve | 5 |
| Calcium Aluminate | 2 |

*Average fiber length

After cure and post-cure conditioning as described in Examples 3 to 6, the pads are tested on a full size 1976 Mercury Sedan in a modified procedure analogous to that described for Examples 27 through 29. In this test the fade stops in step 2 are increased to 20, and step 5 is omitted. The results are as follows:

| | |
|---|---|
| Noise and Rubber Banding | 3 Instances rubber banding, 1 instance wire brush on second series of fade stops, 13 instances smoke and odor, 2 light, 2 heavy and 4 instances 1st series |
| Lining Condition | Pads were very light surface cracked |
| Maximum Wear (in) | .041 |
| Comments | Substantial improvement over |

-continued
previous formulations

EXAMPLES 53-58

Compound the ingredients shown in Table XX in a fashion analogous to that described in the prior examples.

TABLE XX

| | Example No. Quantity (p.b.w.) | | | | | |
|---|---|---|---|---|---|---|
| | 53 | 54 | 55 | 56 | 57 | 58 |
| Thermosetting urea-formaldehyde resin | 22 | | | | | |
| Thermosetting cresol-formaldehyde resin | | 22 | | | | |
| Thermosetting melamine-formaldehyde resin | | | 22 | | | |
| Thermosetting epoxy resin derived from epichlorohydrin, biphenol A and esterified with mixed, low unsaturated, fatty acids | | | | 24 | | |
| Silicone resin in xylene with tin soap catalyst | | | | | 24* | |
| Alkyd resin based on phthalic anhydride and glycerol modified with low unsaturated fatty acid | | | | | | 24 |
| Calcium carbonate | 40 | 40 | 40 | 40 | 40 | 40 |
| Fiberglass (fluffed-⅛ in.) | 5 | 5 | 5 | 5 | 5 | 5 |
| Fiberglass (fluffed-¼ in.) | 5 | 5 | 5 | 5 | 5 | 5 |
| Cashew particles | 14 | 14 | 14 | 14 | 14 | 14 |
| Rubber particles | 8.8 | 8.8 | 8.8 | 8.8 | 8.8 | 8.8 |
| Barytes | 25 | 25 | 25 | 25 | 25 | 25 |
| Zinc Metal Chips | 4 | 4 | 4 | 4 | 4 | 4 |
| Carbon black | 1 | 1 | 1 | 1 | 1 | 1 |
| Hexmethylene Tetramine | 2 | 2 | 2 | 2 | 2 | 2 |
| Molecular Sieve | 5 | 5 | 5 | 5 | 5 | 5 |
| Calcium aluminate | 2 | 2 | 2 | 2 | 2 | 2 |

*Solids basis

Mold the compounded materials into the desired form for brake pads and cure and post cure condition in a fashion analogous to that described for Examples 3 to 6 to obtain brake pads suitable for mounting and use in conventional fashion.

The subject matter which applicant regards as his invention is particularly pointed out and distinctly claimed as follows:

1. A friction material, substantially free of asbestos, which comprises:
   (a) a thermosetting resin;
   (b) cashew nut particles;
   (c) from 5% to 15% of a non-asbestos fiber; and
   (d) more than 20% by weight of a powdered inorganic compound having a Moh's hardness rating of greater than 2.0 and less than 5.0 and capable of being subjected to temperatures of greater than about 425° C. without substantial chemical or physical alteration.

2. A composition as defined in claim 1 which additionally comprises barytes.

3. A composition as defined in claim 1 which additionally comprises rubber particles.

4. A composition as defined in claim 1 which additionally comprises non-ferrous metal chips.

5. A composition as defined in claim 1 which additionally comprises 1% to about 15% by weight of an unloaded molecular sieve.

6. A composition as defined in claim 1 wherein the powdered inorganic compound is zinc oxide.

7. A composition as defined in claim 1 wherein the inorganic compound is calcium carbonate.

8. A composition as defined in claim 1 wherein the powdered inorganic compound is a mixture of zinc oxide and calcium carbonate.

9. An improved friction composition suitable for use in brakes in automotive vehicles wherein the improvement comprises the replacement of substantially the entire asbestos content of a conventional automotive brake friction composition with greater than 20% by weight of the total composition contents of a powdery inorganic material as defined in claim 1 and from 5 to 15% by weight of the total composition contents of a non-asbestos fiber.

10. An improved automotive braking system wherein the improvement comprises the use in a conventional automotive braking system of friction pads of the composition described in claim 1.

11. A process for the manufacture of an automotive brake shoe assembly which is substantially free of asbestos which comprises fastening to a metallic brake shoe, a brake shoe pad fabricated from the composition of claim 1.

12. A composition as defined in claim 1 wherein the thermosetting resin is a phenolic resin.

13. A composition as defined in claim 1 which comprises by weight
   (a) from 10% to 30% by weight thermosetting resin;
   (b) from 5% to 25% cashew nut particles;
   (c) from 5% to 15% non-asbestos fibers; and
   (d) from 20% to 60% of the inorganic compound.

14. A composition as defined in claim 1 which comprises by weight:
   (a) from 15% to 20% of thermosetting resin;
   (b) 15% to 20% cashew nut particles;
   (c) 6% to 12½% non-asbestos fibers; and
   (d) 25% to 35% of the inorganic compound.

15. A composition as defined in claim 14 which additionally comprises by weight:
   (a) from 3% to 10% rubber particles;
   (b) from 10% to 30% barytes
   (c) from 1.5% to 6% metal particles;
   (d) from 0.2% to 2% carbon black;
   (e) from 0.5% to 5% hexamethylene tetramine; and
   (f) from 0.5% to 5% calcium carbonate.

16. A composition as defined in claim 15 which additionally comprises by weight from 10% to about 15% of an unloaded molecular sieve.

17. A composition as defined in claim 1 which comprises by weight:
   (a) from 29% to 32% calcium carbonate;
   (b) from 3.5% to 4.0% fluffed fiberglass floc, average fiber length about ⅛ inch;
   (c) from 3.5% to 4.0% fluffed fiberglass floc, average fiber length from ¼ inch to ½ inch;
   (d) from 15% to 18% thermosetting phenolic resin;
   (e) from 9% to 12% cashew nut particles;
   (f) from 6.0% to 7.5% rubber particles;
   (g) from 17% to 20% barytes;
   (h) from 2.5% to 4.0% zinc metal chips;
   (i) from 0.5% to 1.5% carbon black;
   (j) from 1.0% to 2.0% hexamethylene tetramine; and
   (k) from 1.0% to 2.0% calcium aluminate.

18. A composition as defined in claim 17 which additionally comprises by weight from 3.0% to 4.5% of an unloaded molecular sieve.

* * * * *

UNITED STATES PATENT OFFICE
CERTIFICATE OF CORRECTION

Patent No. 4,137,214  Dated January 30, 1979

Inventor(s) Henry A. Sochalski

It is certified that error appears in the above-identified patent and that said Letters Patent are hereby corrected as shown below:

Column 2, lines 64-65, delete "automatic" and insert therefor -- automotive --.

Column 8, Table VII, Example 9, delete "ratng" and insert therefor -- rating --.

Columns 9 and 10, Table XI, Example 20, Lining Condition, after "L. Side Broken" and before "Spewing", add -- R. Side Heavy --.

Column 10, Table XI, Example 21, Lining Condition, delete "R. Side Heavy".

Columns 11 and 12, Table XI-continued, Example No. 25, Test Evaluation, delete "same" and insert therefor -- some --.

Column 12, line 22, delete "mole" and insert therefor -- mile --.

Columns 13 and 14, Table XV, Example No. 39, Lining Condition, delete "crdacks" and insert therefor -- cracks --.

Signed and Sealed this

Thirteenth Day of May 1980

[SEAL]

Attest:

SIDNEY A. DIAMOND

Attesting Officer  Commissioner of Patents and Trademarks